(12) United States Patent
Schuver et al.

(10) Patent No.: US 8,731,976 B1
(45) Date of Patent: May 20, 2014

(54) SYSTEM AND METHOD FOR PROVIDING A GUARANTEE WITHIN A DEFERRED ANNUITY FOR INSURING A SECURITY

(71) Applicants: Steven S Schuver, St. Louis, MO (US); David D Schuver, St. Louis, MO (US); Thomas L Bakos, Ridgway, CO (US)

(72) Inventors: Steven S Schuver, St. Louis, MO (US); David D Schuver, St. Louis, MO (US); Thomas L Bakos, Ridgway, CO (US)

(73) Assignee: SBH, Inc., St. Louis, MO (US)

( * ) Notice: Subject to any disclaimer, the term of this patent is extended or adjusted under 35 U.S.C. 154(b) by 0 days.

(21) Appl. No.: 13/750,516

(22) Filed: Jan. 25, 2013

(51) Int. Cl.
*G06Q 40/08* (2012.01)

(52) U.S. Cl.
USPC ............................................. 705/4

(58) Field of Classification Search
USPC ............................................. 705/4
See application file for complete search history.

(56) References Cited

U.S. PATENT DOCUMENTS

| | | | |
|---|---|---|---|
| 8,090,601 B2 | 1/2012 | Schuver et al. | |
| 8,160,903 B2 | 4/2012 | Schuver et al. | |
| 2005/0288969 A1 | 12/2005 | Schuver et al. | |
| 2005/0289033 A1 | 12/2005 | Schuver et al. | |
| 2005/0289049 A1 | 12/2005 | Schuver et al. | |
| 2006/0143114 A1 | 6/2006 | Schuver et al. | |
| 2007/0027728 A1 | 2/2007 | Schuver et al. | |
| 2009/0030823 A1* | 1/2009 | Tatro et al. | 705/35 |
| 2010/0191548 A1* | 7/2010 | Herr et al. | 705/4 |
| 2011/0270634 A1 | 11/2011 | Schuver et al. | |
| 2011/0282696 A1* | 11/2011 | Weiss et al. | 705/4 |
| 2011/0313796 A1* | 12/2011 | Joyce | 705/4 |
| 2012/0221360 A1 | 8/2012 | Schuver et al. | |

* cited by examiner

*Primary Examiner* — James A Vezeris
*Assistant Examiner* — Liz P Nguyen
(74) *Attorney, Agent, or Firm* — David H. Chervitz

(57) ABSTRACT

A system for providing a guarantee within a deferred annuity for insuring a security against a change in value of the security is disclosed which comprises a computer system configured to have entered information related to a security to be insured by the guarantee within the deferred annuity, the computer system configured to prepare the guarantee within the deferred annuity based upon the entered information related to the security to be insured, the deferred annuity having an account value, and the security to be insured being held in an account separate from the account value of the deferred annuity.

14 Claims, 5 Drawing Sheets

Fig. 8

- PREMIUM AMOUNT [ ] — 202
- ACCEPT ☐ 204    REJECT ☐ 206    RECALCULATE ☐ 208
- PAYMENT METHOD
  - CHARGE CARD ☐ — 210
  - BANK ACCOUNT ☐ — 212

- NAME OF FIRST SECURITY [ ] — 224
- AMOUNT OF COVERAGE [ ] — 226
- NAME OF SECOND SECURITY [ ] — 228
- AMOUNT OF COVERAGE [ ] — 230
- NAME OF THIRD SECURITY [ ] — 232
- AMOUNT OF COVERAGE [ ] — 234
- TERM [ ] — 236
- 222
- SUBMIT FOR PREMIUM CALCULATION ☐ — 238

220

SYSTEM AND METHOD FOR PROVIDING A GUARANTEE WITHIN A DEFERRED ANNUITY FOR INSURING A SECURITY

BACKGROUND

This disclosure relates to protecting a security, securities, a portfolio of securities, or a portion of a portfolio of securities and more particularly to a system and method for providing a guarantee within a deferred annuity or other form of insurance for insuring a security, securities, a portfolio of securities, or a portion of a portfolio of securities.

Investors may invest for a number of different reasons in numerous types of securities in an attempt to achieve short-term or long-term appreciation in the price or value of the security. For example, investment may be made as savings for retirement or as savings for other important financial events such as purchasing a home, purchasing an automobile, or paying for a college education. In particular, an investor among other things may invest in or obtain an interest in stocks, mutual funds, options, commodities, futures, derivatives, stock index futures, certificates of deposit, exchange traded funds, or bonds by purchasing such securities. Initially, such securities or assets have a purchase price or basis. The investor attempts to maximize the return on investment by selecting assets or securities that either increase in value or do not allow their principal to erode or decline in value. Due to the unpredictable and volatile nature of securities, investors may find it advantageous to protect the principal by preventing any loss that may occur in the purchase price or basis of the security. One way to try to protect against such an occurrence is to purchase an option contract. For example, an option contract gives an investor the right, but not the obligation, to purchase or sell a certain number of shares of stocks or other types of securities at a specific price at a specific future time. An investor pays a price for the right to purchase or sell the certain number of shares at the specific price at a future date. If the investor does not purchase or sell the stock, the investor is out the money paid to purchase the option contract. However, such option contracts are complex, difficult to understand, date limited, risky, and expensive. Further, such option contracts are only available for a limited number of stocks and cannot be purchased for other securities such as mutual funds. Accordingly and unfortunately, options contracts do not offer the protection sought or needed.

Some investors have bought government bonds or debt obligations that are backed or guaranteed by a government in an attempt to protect against a decrease in value in a security. However, such bonds pay an interest rate that is below the market interest rate making it a less attractive security. Additionally, some government-backed bonds require a large amount of money to purchase these bonds. Thus, the purchases of such bonds are only practical for large institutions, banks, or companies. Again, such bonds do not allow an individual investor the opportunity to hedge their risks.

Another known investment tool that some investors use to obtain an income stream is an annuity. An annuity is a contract between an insurance company and an individual, the insured, in which the insured pays the insurance company a premium that will later be distributed back to the insured over a period of time. An annuity contract may provide a fixed guaranteed payment over time until the death of the insured or until a final date, whichever comes first. The majority of annuity customers use annuities to accumulate funds free of income and capital gains taxes and to later take a lump-sum withdrawal without using the guaranteed payment for life feature. Annuities are available in two basic types of contracts. One is the deferred annuity and the other is the immediate or payout annuity.

Deferred annuities are essentially life insurance products through which values are accumulated, on a tax deferred basis, with the nominal purpose of applying the accumulated value on a maturity date in the future to purchase a payout annuity. The maturity date may be a planned retirement date, such as the insured reaching the age of 65. The payout annuity provides a stream of periodic payments guaranteed to be provided according to the terms selected by the insured or annuitant when the funds were applied on the maturity date. Deferred annuity products sold by life insurance companies contain investment guarantees applied to the accumulation values within the product during the deferral period. Deferred annuity products also provide interest and mortality guarantees associated with the minimum payout annuity available to the annuitant on the maturity date. However, it should be noted that deferred annuities are rarely "annuitized". That is, rarely is the accumulated value actually applied to purchase a payout annuity. Since annuitization results in a loss of liquidity for the annuitant, well less than 5% of deferred annuities are converted to payout annuities on a maturity date.

Deferred annuity products may be further distinguished by the nature of the account value inside the product. For example, a deferred annuity may be a traditional deferred annuity, a variable deferred annuity, or an indexed deferred annuity. The account value of a Traditional or General Account deferred annuity is invested in the general account of the insurance company selling the deferred annuity. The insurance company provides a minimum interest rate guarantee that will be applied to the account value and principle is guaranteed not to decrease. The account value of a variable deferred annuity is invested in sub-accounts of a separate account of the insurance company selling the deferred annuity. A "plain" variable annuity (VA) effectively transfers investment risk from the insurance company to the VA owner. This is because the owner chooses from among the offered investments in the variable account of the VA and experiences directly the investment ups and downs—including the possibility of capital losses.

In order to make variable annuity products more attractive to potential buyers, insurers have created a class of benefits referred to as guaranteed living benefits (GLBs) through which the insurer retains some of the investment risk that would otherwise have been transferred to the annuity owner. In deferred variable annuities these GLBs take a number of forms and all of these benefits are usually only available for election at the time the VA is issued.

One form is known as a Guaranteed Minimum Income Benefit (GMIB). This provides a minimum income or payout benefit at time of annuitization (if the VA is annuitized). If the actual accumulated account value would provide a higher benefit, then that higher income benefit is provided. The minimum may be expressed in many different ways and there may be restrictions imposed. For example, the GMIB is only available if the VA is annuitized and the contract may be required to be in force for a number of years before such annuitization. There is typically an additional fee for this benefit which has the effect of reducing the net investment return available.

Another form is known as a Guaranteed Minimum Accumulation Benefit (GMAB). The GMAB is similar to the GMIB except that the minimum is applied to the Accumulation Value. Any VA benefit that is set in relation to the Accumulation Value can be affected by this minimum. Therefore, annuitization may not be required to activate the benefit. The minimum may be expressed in a number of different ways and there may be restrictions on the application of the minimum. For example, the minimum benefit is typically only available on specified benefit dates (perhaps 10 years after issue) or may be available only in specified contingencies like nursing home confinement. There is typically an additional fee for this benefit which has the effect of reducing the net investment return available.

A third form is known as a Guaranteed Minimum Withdrawal Benefit (GMWB). This benefit allows the annuity owner to withdraw a set percentage or amount of the Accumulation Value over a set period of time. The benefit is, typically, designed to guarantee that at least the principal deposit into the VA contract will be available for withdrawal over time. Usually the guarantee allows the principal deposit accumulated at some guaranteed minimum rate of interest to be withdrawn over the specified period—something like 15-20 years. The minimum may be expressed in a number of different ways and there may be restrictions on the application of the minimum.

There is also Guaranteed Payout Annuity Floor (GPAF). An immediate, or payout, VA may also provide the GPAF which provides an annuitant receiving payout benefits a guaranteed minimum benefit. This guarantee might also be provided on a deferred VA with respect to benefits received through its annuitization feature. There is typically an additional fee for this benefit which has the effect of reducing the net investment return available.

Though not a GLB, through provision of a Guaranteed Minimum Death Benefit (GMDB) the insurer also retains some investment risk that would otherwise have been transferred to the VA annuity owner. The GMDB guarantees a death benefit equal to, at least, the premiums paid into the VA contract. Other forms of the GMDB relate the death benefit amount to the highest level of the Accumulation Value at points in the past. Typically the GMDB is provided as an embedded benefit for which a small charge has been reflected in the pricing. Therefore, the VA fees or charges are slightly higher which has the effect of reducing the net investment return available.

The account value of an indexed deferred annuity is invested in the general account of the insurance company issuing the policy. Indexed deferred annuities guarantee principal and interest rate guarantees applied to the account value are guaranteed by a rate calculated in reference to an index, such as for example the S&P 500 which is, generally, greater than zero. However, deferred annuities may be difficult to understand, are expensive to purchase because of fees and charges applied, reduce the liquidity of amounts invested by subjecting them to surrender charges, and do not provide protection for securities.

In view of the above, it would be desirable to protect an asset or a security from declining in value. It is also desirable to protect an individual's portfolio or a portion of the portfolio that may be comprised of combinations of various securities. It would also be advantageous to offer a product or contract, such as a deferred annuity whose account value in some way consisted of or was related to or indexed to a security or portfolio of securities, that would be able to protect against a change in the value of a security or portfolio of securities. There is also a need for insurance for an account value of a deferred annuity consisting of or related to or indexed to a security or a portfolio of securities. Together, this insurance or protection is a securities insurance guarantee.

The present disclosure is designed to obviate and overcome many of the disadvantages and shortcomings associated with attempting to protect the value of a security or a portfolio of securities. In particular, the present disclosure is a system and method for providing a deferred annuity which provides guarantees with respect to an account value related to or indexed to a security or a portfolio of securities. Moreover, the system and method of the present disclosure can be employed to insure or guarantee against a decrease or an increase in the price of a security or a portfolio of securities.

SUMMARY

In one form of the present disclosure, a system for providing a guarantee within a deferred annuity for insuring a security against a change in value of the security comprises a computer system configured to have entered information related to a security to be insured by the guarantee within the deferred annuity, the computer system configured to prepare the guarantee within the deferred annuity based upon the entered information related to the security to be insured, the deferred annuity having an account value, and the security to be insured being held in an account separate from the account value of the deferred annuity.

In another form of the present disclosure, a system for providing a guarantee within a deferred annuity for insuring a portfolio of securities against a change in value of the portfolio of securities comprises a computer system configured to have entered information related to the portfolio of securities to be insured by the guarantee within the deferred annuity, the computer system configured to prepare the guarantee within the deferred annuity based upon the entered information related to the portfolio of securities to be insured, the deferred annuity having an account value, and the portfolio of securities to be insured being held in an account separate from the account value of the deferred annuity.

In still another form of the present disclosure, a system for providing a guarantee within a deferred annuity for insuring a security against a change in value of the security comprises a computer system configured to have entered information related to a security to be insured by the guarantee within the deferred annuity, the computer system configured to prepare the guarantee within the deferred annuity based upon the entered information related to the security to be insured, the deferred annuity having an account value, and the security to be insured being held within the account value of the deferred annuity.

In light of the foregoing comments, it will be recognized that the present disclosure provides a system and/or a method for providing a guarantee within a deferred annuity for insuring a security which insures against a loss or decline in the purchase price or the value of a security or a portfolio of securities.

The present disclosure also provides a system and method for providing a guarantee within a deferred annuity for insuring a portfolio of securities or a portion of a portfolio of securities.

The present disclosure provides a system and method for providing a guarantee within a deferred annuity for insuring a security that is easy to use, understand, and purchase.

The present disclosure also provides a system and method for providing a guarantee within a deferred annuity for insuring a security that provides for the selection of various parameters of a deferred annuity.

The present disclosure provides a guarantee within a deferred annuity that insures against a decline in value of a security without having to place the security into the deferred annuity.

BRIEF DESCRIPTION OF THE DRAWINGS

These and other advantages of the present disclosure will become apparent after considering the following detailed specification in conjunction with the accompanying drawings, wherein:

FIG. 8 is an illustration of a screen that may be presented during use of the system for providing the deferred annuity to accept a premium for a guarantee provided within a deferred annuity; and FIG. 9 is an illustration of a screen that may be presented during use of the system for providing the deferred annuity to enter parameters for providing a guarantee relative to a portfolio of securities.

DETAILED DESCRIPTION OF PREFERRED EMBODIMENTS

Figure 1:
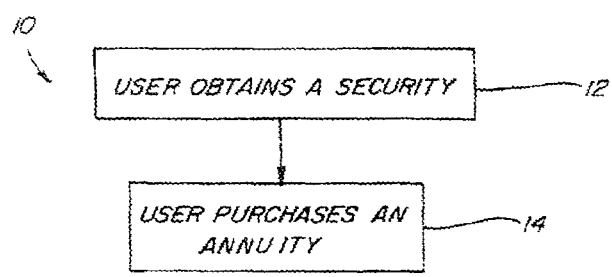
FIG. 1 is a flow chart diagram illustrating a preferred operation of the method for providing a guarantee within a deferred annuity for insuring a security according to the present disclosure.

Referring now to the drawings, wherein like numbers refer to like items, number 10 identifies a method for providing a guarantee within a deferred annuity for insuring a security according to the present disclosure. With reference now to FIG. 1, the method 10 is shown to comprise a first step 12 in which a user obtains, acquires, or purchases a security. Examples of securities that may be obtained, acquired, or purchased are stocks, bonds, mutual funds, options, commodities, futures, derivatives, stock index futures, certificates of deposit, and exchange traded funds. Although a security has been referenced, it is possible that securities or a portfolio of securities may be purchased. A second step 14 of the method 10 comprises a user purchasing a deferred annuity having an insurance guarantee to protect against a change in the value of the security obtained in the step 12. Proof of ownership or interest in the security may be required in order to purchase or issue the deferred annuity. However, a transfer of the security into the deferred annuity is not required. The deferred annuity is an insurance contract that provides a purchaser with a guarantee or insurance against any decrease in the value or the price of the security. In particular, if at the end of the term of the guarantee within the deferred annuity the value or price of the security is below the guaranteed or insured value of the security, the guarantee within the deferred annuity will pay the difference between the guaranteed value of the security and the value or the price of the security on the day that the guarantee within the deferred annuity policy terminates. It is possible and contemplated that a user may purchase a guarantee within the deferred annuity at any time the user owns or has an interest in the security. In other words, it is not necessary that the user purchase the guarantee within the deferred annuity when a security is initially purchased or obtained. It is also possible that the user may purchase the guarantee within the deferred annuity when the security is initially purchased or obtained and later on purchase another guarantee within the deferred annuity if the security increases in price or value. Further, it is contemplated that the deferred annuity may protect against a gain in the price or value of a security in the case of a short sale. A security may be obtained in several ways as by gift, inheritance, purchase, settlement, wager, theft, discovery or treasure, contract, or by agreement.

One embodiment of a guarantee within a deferred annuity of the present disclosure has the following features and benefits. The security to be insured or the account value is maintained outside of the deferred annuity and the deferred annuity principal guarantees on investment and mortality are provided inside the deferred annuity. This allows an investor the ability to fully control the security and to participate in principal guarantees typically provided only within deferred annuity contracts. No premium to fund an account value would be paid into the deferred annuity of the present disclosure because no account value is held, managed, or maintained within the deferred annuity contract. The account value is held entirely outside of the deferred annuity and provision is made for applying it, after conversion to cash, to annuitize the deferred annuity in order to acquire a payout annuity. In another embodiment of a guarantee within a deferred annuity of the present disclosure, the security to be insured or the account value may be maintained within the deferred annuity.

Any premium paid into the deferred annuity is designed to cover only the account value guarantees and mortality guarantees provided by the terms of the deferred annuity contract. This premium may also include a small fee to cover the cost of maintaining the contract in force. For example, an expense charge to cover contract maintenance, an expense charge separate and distinct from a risk charge to cover the administrative cost of providing an account value principal guarantee, and a charge to cover the cost of providing the interest and mortality guarantees inherent in the payout annuity guarantee would be included in the premium.

A virtual, shadow, or hypothetical account value would be created within the deferred annuity to mimic the actual dollar account value which would remain under the total control and management of the investor. The real or actual account that is to be insured or guaranteed remains in the investor's broker or dealer account. The hypothetical or shadow account value would be used to facilitate the calculation of any benefits payable under the account value principal guarantee of the deferred annuity. Since the investor would maintain total control and management over the security or the investment, the insurance company would not be selling, managing, or making investment decisions or recommendations regarding the security or investment portfolio to which the guarantee applied. The deferred annuity would only be providing an insurance guarantee. Since no money to fund an account would actually be paid into the deferred annuity and no funds would be maintained or managed by the insurance company relative to an account value in the deferred annuity, only insurance guarantees would exist within the deferred annuity. As is typical for other deferred annuity products, it is expected that the deferred annuity of the present disclosure would rarely be annuitized since doing so would require the security or securities held outside the deferred annuity to be converted to cash and applied by an investor to purchase a payout annuity resulting in a loss of liquidity for the investor.

The following is an example of how the deferred annuity operates. TABLE 1 and TABLE 2 will be referenced in explaining the guarantee within the deferred annuity. TABLE 1 illustrates an investor's portfolio of securities that are owned by the investor that may be held in a broker's account such as a Charles Schwab account. The first column of TABLE 1 indicates the market value of the portfolio and in this particular example the market value is initially $100,000. The investor desires to guarantee or insure that after one year the market value of this account will be at least $90,000. In other words, the investor is willing to accept only a 10% decline in market value of the portfolio. In order to accomplish this the investor purchases the deferred annuity of the present disclosure. The investor will pay a premium for guarantee within the deferred annuity with the premium being paid annually or as recurring single premiums. Further, in this particular example, the deferred annuity has a maturity date that is five years in the future. In the first year, the investor selected an account value guarantee of 90% of the market value of the security held outside the deferred annuity as of the beginning of the contract term. This guarantee can be for some other percentage in future years, as will be discussed. In essence, the deferred annuity will guarantee that the account value will be at least $90,000 at the end of the first year. In this example, at the end of the first year the actual market value of the portfolio has decreased to $85,000. The deferred annuity will then payout a sum of $5,000 to the investor to bring the market value of the security up to $90,000, the guaranteed amount. At the end of the first year, the account market value held outside the deferred annuity is $90,000. At the beginning of the second year the end of year guaranteed amount is now $81,000, which is 90% of $90,000. At the end of the second year, the market value of the security is now $110,000. Since the market value is greater than the $81,000 guaranteed amount no benefit is paid. In the beginning of the third year, the market value is $110,000. The investor decides to change the percentage to 100%. At the end of the third year the market value has increased to $112,000. Since there has been an increase in the market value there will be no payout to the investor. At the beginning of the fourth year the investor again decides to change the percentage to 90% of the market value. This means that the guaranteed value for the fourth year will be $100,800, which is 90% of 112,000. At the end of the fourth year the account market value is $125,000. Since the account market value is greater than the account value guarantee no benefit is due. During the fifth year, the investor keeps the percentage at 90%. At the end of the fifth year, the value of the investor's account is $125,000 and this amount might be converted to cash and applied under the terms of the deferred annuity contract payout guarantee to provide a monthly income at retirement. However, as indicated, typically deferred annuities are not annuitized.

TABLE 1

Investor's Portfolio

| Value Beginning of Year | Value End of Year | Benefit Paid |
|---|---|---|
| 1: $100,000 | 1: $85,000 | 1: $5,000 |
| 2: $90,000 | 2: $110,000 | 2: $0 |
| 3: $110,00 | 3: $112,000 | 3: $0 |
| 4: $112,000 | 4: $125,000 | 4: $0 |

TABLE 1-continued

Investor's Portfolio

| Value Beginning of Year | Value End of Year | Benefit Paid |
|---|---|---|
| 5: $125,000 | 5: $125,000 | 5: $0 |

TABLE 2

Deferred Annuity Policy

| Shadow Account End of Year | End of Year Guarantee | End of Year Benefit |
|---|---|---|
| 1: $85,000 | 1: $90,000 | 1: $5,000 |
| 2: $110,000 | 2: $81,000 | 2: $0 |
| 3: $112,000 | 3: $110,000 | 3: $0 |
| 4: $125,000 | 4: $100,800 | 4: $0 |
| 5: $125,000 | 5: $112,500 | 5: $0 |

As can be appreciated, the shadow account in the deferred annuity mimics the performance of the investor's actual account held outside of the deferred annuity. The shadow account is not real and has no real securities in it. The shadow account is a hypothetical account that is used to calculate the account value guarantee of the deferred annuity. On the maturity date of the deferred annuity an amount equal to the shadow account value may be paid in and annuitized under the terms of the deferred annuity contract or policy. The investor has the option of monetizing the investor's securities account to accomplish this.

Figure 2:
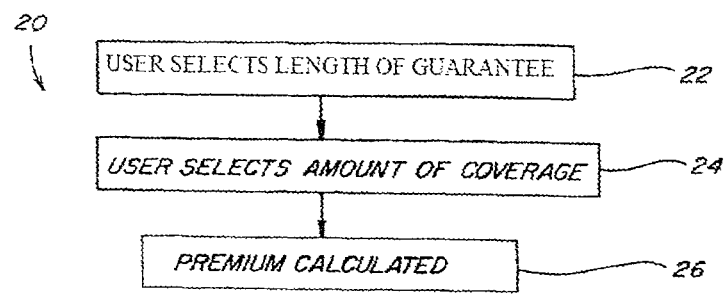
FIG. 2 is a flow chart diagram illustrating a method for selecting requirements for the guarantee within the deferred annuity.

FIG. 2 shows a process 20 for the user or investor to use in selecting guarantee requirements for purchasing the deferred annuity. The guarantee requirements include various parameters that may be selected prior to purchasing a guarantee within a deferred annuity, for example, the maturity date of the deferred annuity. In a first step 22, a user selects the length, term, or structure of the guarantee within the deferred annuity. For example, the user may want to insure against a loss in the purchase price or the value of a security or securities for a term of twenty years. The twenty year term represents when the user will retire. Once the length or maturity term is selected, the user selects the amount of coverage as shown in a second step 24. The user may decide that only insuring a portion or a percentage of the value or the price of the security is required or desired. For example, if a security having a value of $100 is purchased, the user may decide that only half of this amount or $50 needs to be insured. In a next step, step 26, a premium amount is calculated based upon parameters such as guarantee length and guarantee amount. Other parameters may be taken into consideration for the calculation of the premium amount. Such other parameters may include the number of shares to be insured, the current share price, interest rates, and volatility. These listed parameters are for purposes of example only and are not inclusive. A guarantee may be renewed for successive coverage terms during the term of the deferred annuity.

Figure 3:
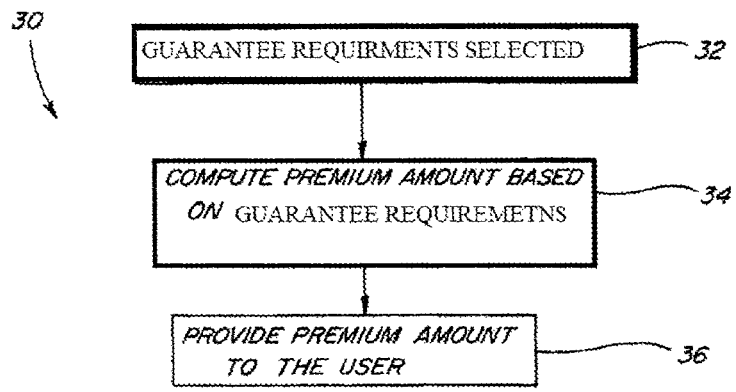
FIG. 3 is a flow chart diagram illustrating a method for calculating a premium amount for the guarantee within the deferred annuity.

With reference now to FIG. 3, a flowchart illustrates a process 30 for calculating a premium amount for purchasing the guarantee within the deferred annuity. First, in a step 32, the user selects guarantee requirements that may include identification of the security, guarantee term, and guarantee amount or account value guarantee. Once the guarantee requirements are selected a premium amount for the guarantee is calculated based on the guarantee requirements. This is accomplished in a step 34. The volatility of a security may be one factor in determining a premium. Higher volatility in the share price of a security will, generally, result in a higher premium. Also, a coverage period of a long term may impact the price of the premium. The amount of coverage and the term may impact the calculated premium amount. Once calculated, the premium amount for the guarantee is provided to the user in a step 36.

Figure 4:
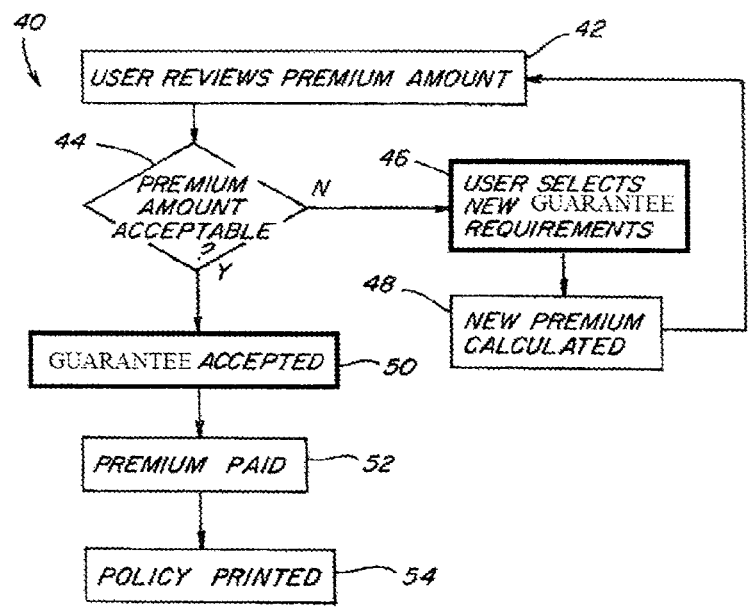
FIG. 4 is a flow chart diagram illustrating a method for issuance of a deferred annuity containing a guarantee.

FIG. 4 is a flowchart that illustrates a process 40 for creating a guarantee within a deferred annuity for insuring a security according to the present disclosure. The user reviews or evaluates the premium amount for the guarantee that has been calculated based on various guarantee requirements in a step 42. Once the evaluation is completed, the user determines, in a step 44, whether the premium amount is acceptable. If the premium is not acceptable then the user enters new guarantee requirements in a step 46. As discussed previously, new guarantee requirements may include guarantee term and guarantee amount or account value guarantee. In a next step 48, a new premium amount is calculated based upon the new guarantee requirements entered in the step 46. The new premium amount for the guarantee is provided to the user in the step 42 where the user again reviews the premium amount.

If in the step 44 the user determines that the premium amount is acceptable, a next step 50 is encountered where the guarantee within the deferred annuity is accepted. Next, in a step 52, the premium amount is paid by the user. Finally, in a step 54, the guarantee within the deferred annuity contract is issued, written, printed, or provided to the user. If the guarantee is being renewed for an additional term, then the guarantee is provided within the previously issued deferred annuity. It is also possible that steps 52 and 54 may be reversed. In particular, the deferred annuity may be provided to the user with a bill or invoice to pay the premium amount. It is also contemplated that the deferred annuity may be issued in electronic form in that the annuity may be sent electronically via e-mail as a text file or a PDF file, or the policy sent or presented on a CD-ROM.

Figure 5:
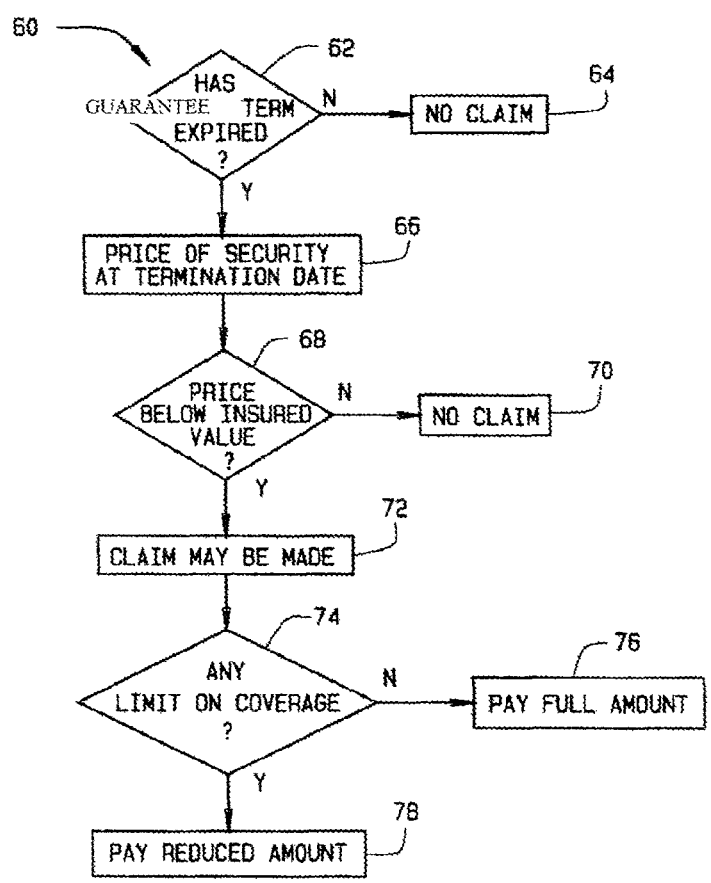
FIG. 5 is a flow chart diagram illustrating a method for determining whether a claim may be made against the deferred annuity containing a guarantee.

Referring now to FIG. 5, a flow chart illustrates a method 60 for determining whether a claim may be made against the deferred annuity which contains the guarantee for insuring a security. The method 60 commences with a first step 62 in which it is determined whether the term of the guarantee within the deferred annuity policy has expired. If it is determined that the term of the guarantee within the deferred annuity has not expired then no claim may be made as is shown in a step 64, as claims may only be made at the end of a term of guarantee coverage. If on the other hand it is determined that the end of the term of the guarantee has occurred then the price of the security on the last day of the term is reviewed in a step 66. Although the price of the security on the last day of the term is used, it is also possible that other methods may be employed to determine the price of the security on the termination date. For example, the value of the security on a day within a stated period of time including the end of the term may be used to determine whether or not a claim may be made or the highest price of the security during the term may be used to determine whether a claim may be made. In a next step 68, it is determined whether the price of the security on the last day of the term of the guarantee is below the account value guarantee. If it is not then no claim may be made against the annuity, as is shown in a step 70. However, as depicted in a step 72, if the price is below the account value guarantee then a claim may be made within the terms of the guarantee within the deferred annuity. Prior to a payment being made under the deferred annuity, it may be required to review the deferred annuity, as illustrated in a step 74, to determine if there was a limit on coverage. If it is determined that the policy does not contain a limit on coverage, then the full account value guarantee is paid to the user. This is depicted in a step 76. In particular, by way of example only, if the security to be insured was one share of stock that had a purchase price of $100 and at the end of the term of coverage the price of the stock was $90 then the guarantee would pay $10 to the user, assuming the security had been insured for 100%. Presumably, this benefit would be deposited into the user's broker account to compensate for the decrease in market value of the security. It is also contemplated that the benefit can be paid into an account within the deferred annuity. If in the step 74 it is determined that there were limitations in the guarantee within the deferred annuity then a reduced amount is paid to the user as is shown in a step 78. For example, using the same numerical amounts as above, and assuming that the guarantee within the deferred annuity had a limit that it would pay for 95% coverage then the benefit that would be paid to the user would be $5.

Figures 6, 7:
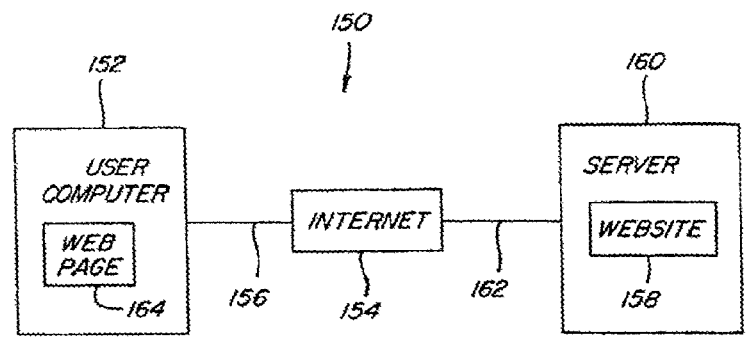
FIG. 6 is a block diagram of a system for providing the deferred annuity constructed according to the present disclosure.
FIG. 7 is an illustration of a screen that may be presented by an insurer to an applicant during use of the system for providing the guarantee within the deferred annuity to enter parameters.

A system for issuing a deferred annuity 150 is illustrated in FIG. 6. The system 150 is shown comprising a user computer system 152 that is capable of being connected to the Internet 154 by a communications connection 156 such as a telephone line, cable, ISDN lines, fiber optic lines, wireless connections, satellites, or other suitable means of connection. Through use of the connection 156 to the Internet 154, the computer 152 is capable of accessing a website 158 on a computer system or a server 160 over a connection 162. The website 158 may be a website of a brokerage, a bank, an insurance company, or any other entity that a user may purchase a security or a deferred annuity. As described for the connection 156, the connection 162 may include a telephone line, cable, ISDN lines, fiber optic lines, wireless connections, satellites, or other means of connection. The server 160 is capable of transmitting to the user computer 152 one or more web pages 164 for viewing by a user of the user computer 152.

The user computer 152 is allowed access to the server 160 through use of a commonly available web browser or similar software package or application. The server 160 is capable of hosting the website 158 which presents various screens or web pages 164 to the user computer 152. A user operating the user computer 152 is able to interact with the website 158 being hosted by the server 160. In particular, a user may be presented with various screens or web pages 164 with such web pages 164 presenting information concerning the purchasing of a security and the purchasing of a guarantee within a deferred annuity for insuring a security. Further, the web pages 164 may have other information such as selecting a length of a policy term, an amount of coverage, and entering of information concerning a security already owned.

The user may be presented with a web page or screen 170 as illustrated in FIG. 7. As shown, various parameters 172 are presented for selection or entry by the user. The user is requested to enter information concerning the name or symbol of the security to be insured by a guarantee within a deferred annuity in a box 174 and the number of shares to be insured by a guarantee within a deferred annuity in a box 176. The amount of coverage desired is entered in a box 178. For example, the user may determine that only half of the value of the security to be insured needs to be covered and this amount is placed in the box 178. The term of the guarantee is selected and entered in a box 180. The user can determine the length of the term of the guarantee. Once the user has entered the parameters 172, a button 182 may be selected to transmit the parameters 172 to the server 160 in order to determine or calculate a premium for a guarantee within a deferred annuity for insuring the security presented in the box 174.

Once the server 160 receives the parameters 172, a premium for a guarantee is calculated. The premium amount is then sent to the user computer 152 to be displayed as a screen or a web page 164. FIG. 8 depicts a web page 200 that may be presented on a display associated with the user computer 152. The web page 200 has a box 202 in which the premium amount is displayed for review by the user. The user may accept the premium amount by selecting a button 204, reject the premium amount by selecting a button 206, or recalculate a premium amount by selecting a button 208. If the button 204 is selected, the user may be requested to indicate a payment method for the premium amount. If the premium is to be paid by a credit card then a box 210 is selected and the user is taken to a new web page to enter further information concerning the credit card. If the premium is to be paid by a bank account then a box 212 is selected and a new web page is presented for entry of bank account information. Other methods of payment, such as cash, check, invoice, or being billed are contemplated and possible and such methods may be incorporated into the web page 200. If the user decides that the premium amount is too high and purchasing the guarantee within the deferred annuity is to be rejected then the box 206 is selected and the user may be taken to a home page of the server 160. On the other hand, if the user selects the box 208, the user will be presented the web page 170 again to enter parameters 172 in an attempt to recalculate the premium amount. For example, the premium amount presented in the box 202 may be more than the user wants to pay. In order to reduce the premium amount the user selects the box 208 and the web page 170 is presented for entry of other amounts. The user, in an attempt to lower the premium, may enter into the box 178 a lower percentage. In this manner, the premium amount is recalculated and the recalculated amount for the premium may be low enough that the user selects the accept box 204. As can be appreciated, several other web pages may be presented to the user. By way of example, web pages may be presented that include the conditions and terms of the guarantee within the deferred annuity and payment confirmation.

Although not shown, the computer system 152 may include peripheral devices such as a keyboard, a speaker, a display, a printer, a modem, a network card, and any other suitable device. The computer system 152 may be a personal computer having a microprocessor, memory, a hard drive having stored thereon an operating system and other software, and input devices such as a mouse, a keyboard, a CD-ROM drive, DVD drive, digital storage device, thumb drive, or cloud storage. The computer system 152 may also be a PDA type device, a cell phone, a smart phone, or other hand held type computer device that allows for receiving and transmitting information or data. Further, the server 160 may take on various known forms for a server including a personal computer, a computer system, or a network. Also, although the Internet 154 is disclosed, it is also possible that the system 150 be located on a LAN or other closed network system.

It is also possible that the guarantee within the deferred annuity may insure a number of securities or a portfolio through use of the present disclosure. With reference now to FIG. 9, a web page 220 is illustrated that provides for entry of more than one security for calculating one premium to provide or issue a deferred annuity containing a guarantee to insure the securities or the portfolio. The web page 220 requests the user to enter various parameters 220. In a box 224, the name of the first security is entered. Below the box 224 is a box 226 in which the amount of coverage for the first security is entered. Once the information for the first security has been entered, information relating to a second security and a third security may be entered in boxes 228, 230, 232, and 234. After the security information has been entered the term for the insurance policy is entered into in a box 236. After all of the parameters 222 have been entered then a button 238 may be selected to calculate a premium amount. The information relating to the parameters 222 are transmitted to the server 160 in order to determine or calculate a premium for a guarantee within a deferred annuity insuring the securities presented in the boxes 224, 228, and 232. It is also possible that there are more boxes for entering other securities or other web pages similar to the web page 220. It is also contemplated that the term and the amount of coverage may be individually selected for each security. In this manner, a portion of the portfolio of securities may be insured. For example, the first security entered may be covered for 100% value, the second security entered may be covered for 50% value, and the third security entered may be covered for 80% value. Further, a listing of individual premiums per security may be provided in which a user may select which security will be insured by the deferred annuity. It may be that the premium for one of the securities to be insured is determined to be too high and the user may select not to insure this particular security.

Although the present system and method have been described by use of electronic means, it is also possible that an agent, a broker, or other salesperson may provide the guarantee within the deferred annuity to a user. For example, an agent may discuss the various securities to be insured and provide a quote for coverage to a user. The user may review the quote and then determine whether to insure the security or securities. In this manner, the user does not directly interact with the system and relies on the agent for information and the premium quote. Also, the agent or the system may already have predetermined premiums or guarantees for any type security, for any amount of coverage, and for any length or term. The user may select the guarantee within the deferred annuity and premium from a listing of the predetermined premiums or deferred annuities.

It is also possible that the security insurance guarantee may be included in a life product such as a variable life insurance policy. The security insurance guarantee of the present disclosure may also be issued as a rider to a life insurance policy or a deferred annuity. For example, someone may have a deferred annuity and money in an investment account outside the deferred annuity. There are guarantees on the account value within the deferred annuity. The insurance company may want to offer a similar securities insurance type guarantee on funds outside the annuity which would allow those funds to be added to the deferred annuity account value if annuitized.

From all that has been said, it will be clear that there has thus been shown and described herein a system and method for providing a guarantee within a deferred annuity for insuring a security which fulfills the various advantages sought therefore. It will become apparent to those skilled in the art, however, that many changes, modifications, variations, and other uses and applications of the subject system and method for providing a guarantee within a deferred annuity for insuring a security are possible and contemplated. All changes, modifications, variations, and other uses and applications which do not depart from the spirit and scope of the disclosure are deemed to be covered by the disclosure, which is limited only by the claims which follow.

What is claimed is:

1. A system for providing a guarantee within a deferred annuity for insuring a security against a change in value of the security comprising a computer system configured to have entered information related to the security to be insured by the guarantee within the deferred annuity and a value of the security to be insured, the computer system further configured to prepare the guarantee within the deferred annuity based upon the entered information related to the security to be insured and the value of the security to be insured, the deferred annuity having a virtual account value equivalent to the value of the security to be insured, the virtual account value being used to calculate a benefit payable under the guarantee within the deferred annuity, and the security to be insured being held in an account separate from the virtual account value of the deferred annuity.

2. The system of claim 1 further comprising the computer system further configured to determine a premium to be paid for purchasing the guarantee within the deferred annuity.

3. The system of claim 1 wherein the computer system is further configured to have information entered related to requirements of the guarantee within the deferred annuity.

4. The system of claim 3 wherein one of the requirements is selecting a maturity date for the deferred annuity.

5. The system of claim 3 wherein one of the requirements is selecting an amount of coverage.

6. The system of claim 1 further comprising the value of the security to be insured changing over time and the virtual account value changing over time with the change in value of the security to be insured being equal to the change in value of the virtual account value.

7. The system of claim 1 wherein the account of the security to be insured is outside of the deferred annuity.

8. A system for providing a guarantee within a deferred annuity for insuring a portfolio of securities against a change in value of the portfolio of securities comprising a computer system configured to have entered information related to the portfolio of securities to be insured by the guarantee within the deferred annuity and a value of the portfolio of securities to be insured, the computer system further configured to prepare the guarantee within the deferred annuity based upon the entered information related to the portfolio of securities to be insured and the value of the portfolio of securities to be insured, the deferred annuity having a virtual account value equivalent to the value of the portfolio of securities to be insured, the virtual account value being used to calculate a benefit payable under the guarantee within the deferred annuity, and the portfolio of securities to be insured being held in an account separate from the virtual account value of the deferred annuity.

9. The system of claim 8 further comprising the computer system further configured to determine a premium to be paid for purchasing the guarantee within the deferred annuity.

10. The system of claim 8 wherein the computer system is further configured to have information entered related to requirements of the guarantee within the deferred annuity.

11. The system of claim 10 wherein one of the requirements is selecting a maturity date for the deferred annuity.

12. The system of claim 10 wherein one of the requirements is selecting an amount of coverage.

13. The system of claim 8 further comprising the value of the portfolio of the securities to be insured changing over time and the virtual account value changing over time with the change in value of the portfolio of securities to be insured being equal to the change in value of the virtual account value.

14. The system of claim 8 wherein the account of the portfolio of securities to be insured is outside of the deferred annuity.

\* \* \* \* \*